(12) United States Patent
Sakakibara

(10) Patent No.: US 12,024,226 B2
(45) Date of Patent: Jul. 2, 2024

(54) STEERING DEVICE FOR A VEHICLE

(71) Applicant: TOYODA GOSEI CO., LTD., Kiyosu (JP)

(72) Inventor: Sayaka Sakakibara, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 212 days.

(21) Appl. No.: 17/574,672

(22) Filed: Jan. 13, 2022

(65) Prior Publication Data

US 2022/0306198 A1    Sep. 29, 2022

(30) Foreign Application Priority Data

Mar. 29, 2021   (JP) ................. 2021-056094

(51) Int. Cl.
| | | |
|---|---|---|
| *B60Q 1/00* | (2006.01) | |
| *B60Q 3/283* | (2017.01) | |
| *B62D 1/06* | (2006.01) | |
| *B62D 15/02* | (2006.01) | |

(52) U.S. Cl.
CPC .......... *B62D 15/029* (2013.01); *B60Q 3/283* (2017.02); *B62D 1/06* (2013.01)

(58) Field of Classification Search
CPC ... B60Q 3/283; B60W 60/0053; B60W 10/20; B60W 40/08; B60W 50/14
See application file for complete search history.

(56) References Cited

U.S. PATENT DOCUMENTS

| | | | | |
|---|---|---|---|---|
| 7,605,693 B2* | 10/2009 | Kulas | ............... | B60K 35/00 |
| | | | | 340/439 |
| 9,159,221 B1* | 10/2015 | Stantchev | ............... | G08C 17/02 |
| 9,481,297 B2* | 11/2016 | Salter | ............... | H05B 47/105 |

(Continued)

FOREIGN PATENT DOCUMENTS

| | | |
|---|---|---|
| JP | 2005-088792 A | 4/2005 |
| JP | 2008-162466 A | 7/2008 |

(Continued)

OTHER PUBLICATIONS

Office Action dated Sep. 5, 2023 issued in corresponding Japanese Patent Application No. 2021-056094 (and English machine translation).

(Continued)

*Primary Examiner* — Toan N Pham
(74) *Attorney, Agent, or Firm* — Posz Law Group, PLC

(57) ABSTRACT

A steering device adapted to be rotated about a steering central axis for maneuvering a vehicle, the steering device including a central portion disposed in a vicinity of the steering central axis, and a rim connected with the central portion. The rim includes left and right grip portions that are respectively disposed in left and right regions of the rim apart from the steering central axis, a grip sensor disposed in each of the left and right grip portions, and four luminous portions each of which is configured to be lit under control of a control unit for prompting the driver to grip the grip portions. The four luminous portions are respectively disposed in a vicinity of a first end of and in a vicinity of a second end of each of the left and right grip portions, in an area out of the left and right grip portions.

8 Claims, 18 Drawing Sheets

(56) References Cited

U.S. PATENT DOCUMENTS

| | | | |
|---|---|---|---|
| 2006/0070795 A1* | 4/2006 | Meissner | G01C 21/3661 180/446 |
| 2011/0187518 A1* | 8/2011 | Strumolo | B62D 15/029 340/438 |
| 2014/0244115 A1* | 8/2014 | Sanma | B60K 35/00 701/42 |
| 2017/0106786 A1 | 4/2017 | Ebina | |
| 2017/0166237 A1 | 6/2017 | Oh et al. | |
| 2018/0273078 A1 | 9/2018 | Mitobe et al. | |
| 2021/0078492 A1 | 3/2021 | Narumi et al. | |

FOREIGN PATENT DOCUMENTS

| | | |
|---|---|---|
| JP | 2017-007478 A | 1/2017 |
| JP | 2018158666 A | 10/2018 |
| JP | 2019-055632 A | 4/2019 |
| WO | 2015/145605 A1 | 10/2015 |

OTHER PUBLICATIONS

Office Action dated Dec. 19, 2023 issued in corresponding Japanese Patent Application No. 2021-056094 (and English machine translation).

* cited by examiner

FIG. 8A

Prompting to Grip Performed at Transition to Manual Driving from Autonomous Driving

| | Autonomous Driving Mode | In the Course of Transition | | | | Manual Driving Mode |
|---|---|---|---|---|---|---|
| Mode Indicator | LIT (Blue) | LIT (Orange) | | | | UNLIT |
| Luminous Portions | UNLIT (Wait Mode M0) | LIT | | | | UNLIT (Wait Mode M0) |
| | | Solid Light (Orange) (Prompting Mode M1) | If a grip is detected, Solid Light (Green) (Grip Confirmation Mode M3) | | | |
| | | | If a grip is not detected within 5 seconds, Solid Light (Red) (Alert Mode M2) | If a grip is not detected within 15 seconds, Blinking Light (Red) (Alert Mode M21) | | |
| Audio Message | (Preliminary Notice) "Autonomous driving will end soon" | (Prompting to Grip, Normal) "Please hold steering wheel" | (Prompting to Grip, Warning) "Please hold steering wheel" | (Notice of Transition to Manual Driving) "The car will pull off to a safe place" | | (Completion Notice) "The car is now in manual driving mode" |

FIG. 8B

Prompting to Grip Performed for Warning the Driver when the Driver is not Holding the Grip Portions during Manual Driving

|  | Manual Driving Mode | | | Urgent Mode | Urgent Mode (Strong) | Warning Mode | Manual Driving Mode |
|---|---|---|---|---|---|---|---|
|  | When a grip is detected | When a grip is not detected | | | | | When a grip is detected |
| Luminous Portions | UNLIT (Wait Mode M0) | If a grip is not detected, Solid Light (Orange) (Prompting Mode M1) | If a grip is not detected within 3 seconds, Solid Light (Red) (Alert Mode M2) | If a grip is not detected within 5 seconds, Blinking light (Red) (Alert Mode M21) | If a grip is not detected within 15 seconds, Blinking Light (Red, Higher Frequency) (Alert Mode M22) | If a grip is not detected within 30 seconds, Blinking Light (Red, Higher Frequency & Higher Brightness) (Alert Mode M23) | UNLIT (Wait Mode M0) |
| Audio Message |  | (Caution) "Please hold steering wheel" | (Warning) "Please hold steering wheel" | (Warning) "Please hold steering wheel immediately" with a warning tone | (Warning) "Please hold steering wheel immediately" with a warning tone | (Slow Down & Stop) "The car will slow down and stop" with a warning tone | "The car will continue manual driving" "The car is now in manual driving mode" "The car made an emergency stop" |

FIG. 13
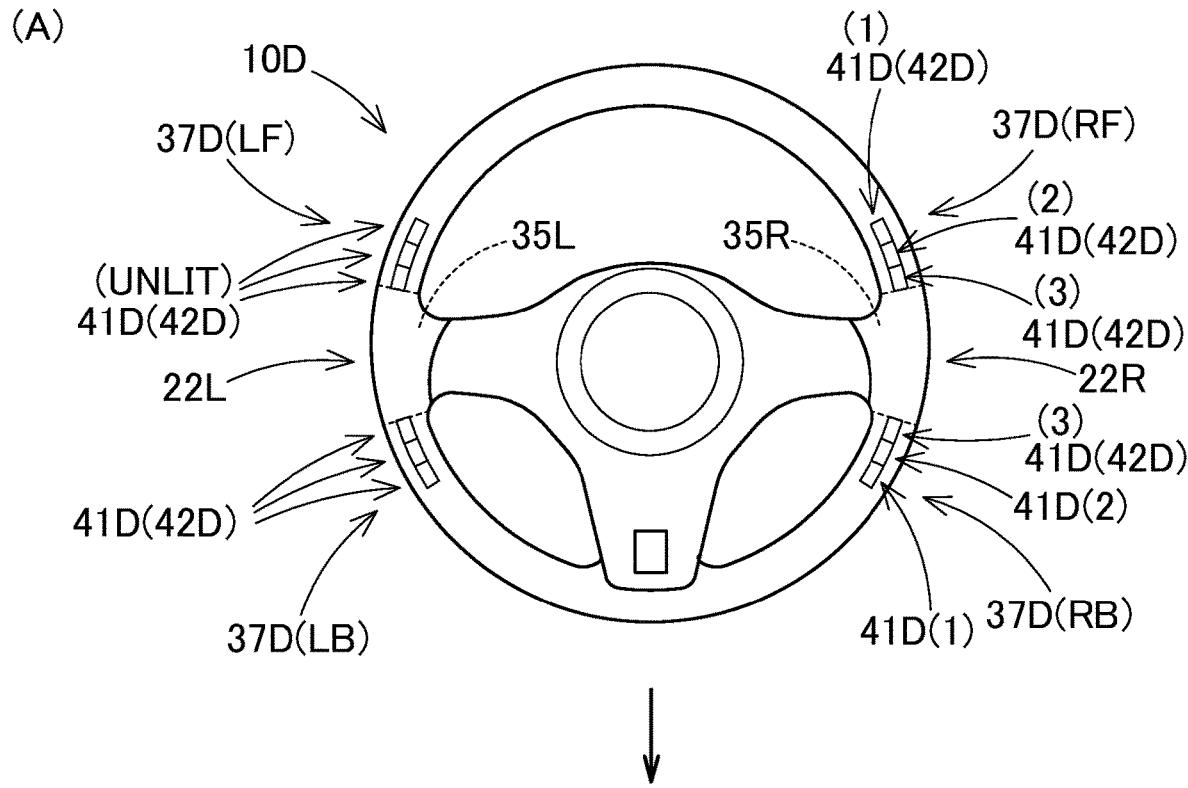
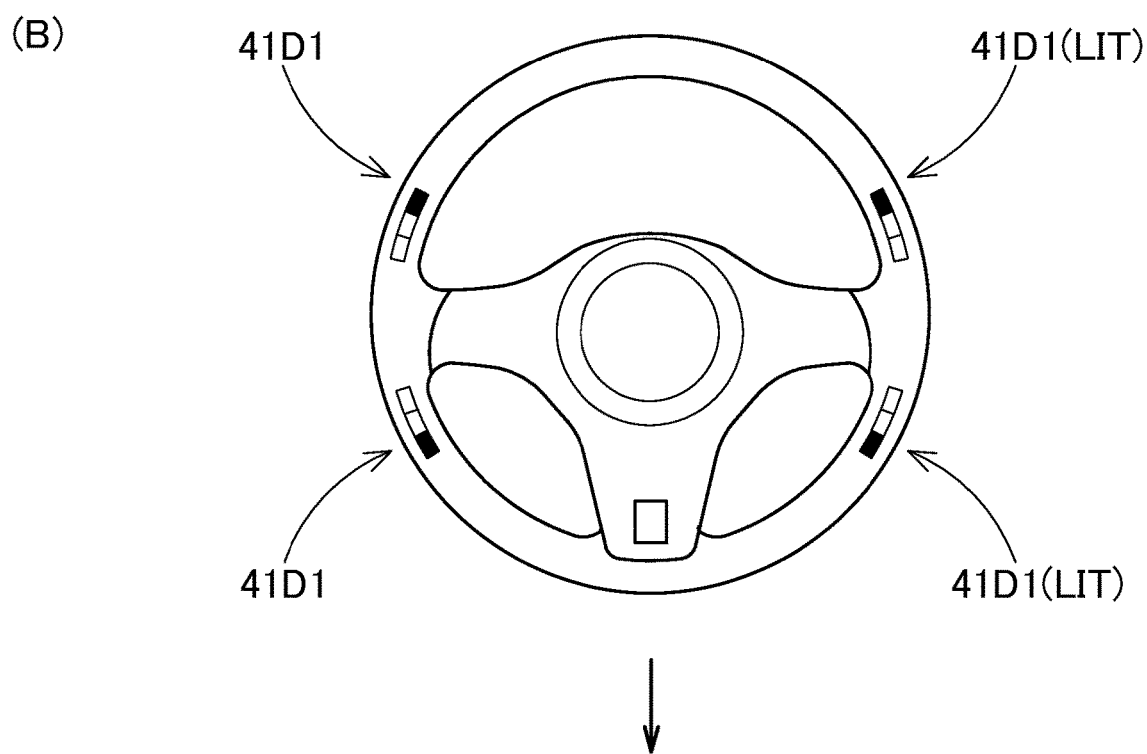

FIG. 14
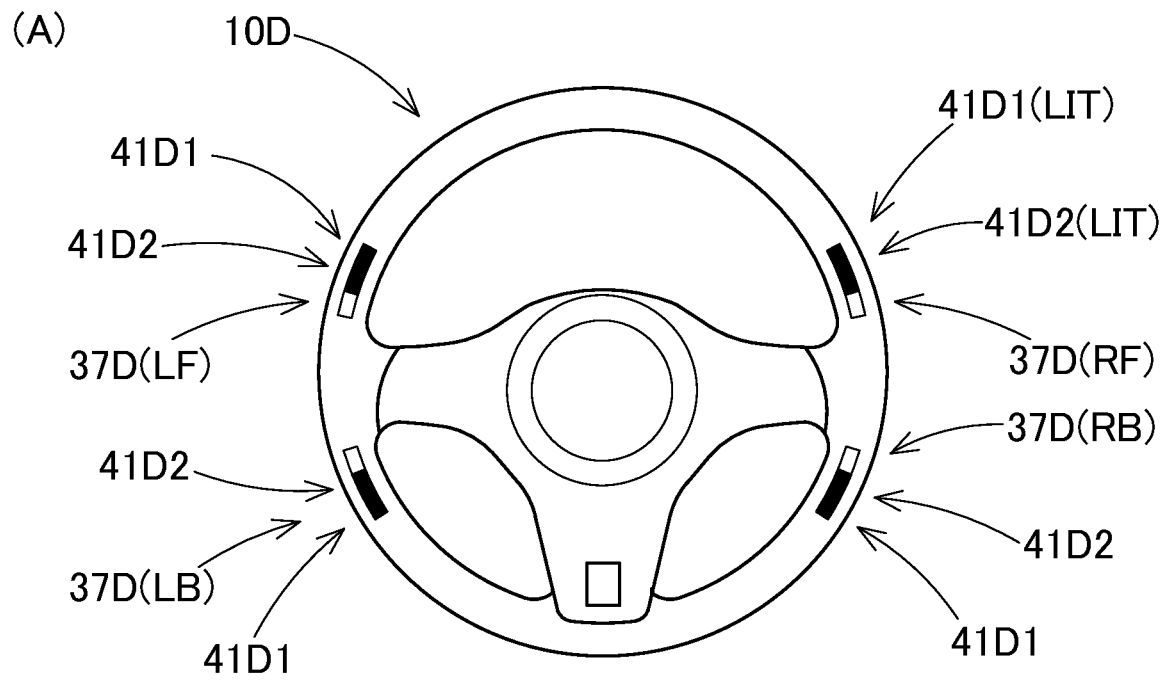
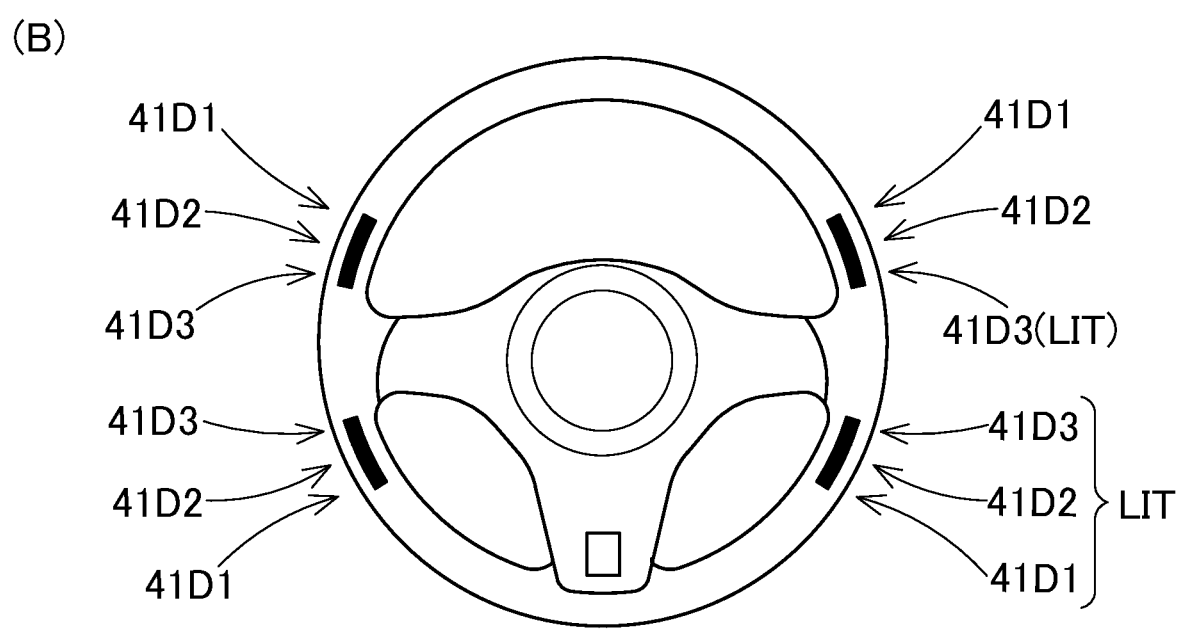

STEERING DEVICE FOR A VEHICLE

CROSS REFERENCE TO RELATED APPLICATIONS

The present application claims priority from Japanese Patent Application No. 2021-56094 of Sakakibara, filed on Mar. 29, 2021, the entire disclosure of which is incorporated herein by reference.

BACKGROUND

1. Technical Field

The present disclosure relates to a steering device for a vehicle that is adapted to be rotated about a steering central axis for maneuvering the vehicle. More particularly, the present disclosure relates to a steering device that includes, in the steering rim portion, one or more luminous portions which are lit to prompt the driver to grip the steering rim portion.

2. Description of Related Art

JP 2019-55632 A discloses a known steering device that includes, in the steering rim portion, one or more luminous portions that is configured to be lit in order to prompt the driver to grip the steering rim portion when the vehicle transitions to the manual driving mode from the autonomous driving mode, or the like.

In the steering device disclosed in the above literature, the luminous portions are located in areas of the steering rim portion to be held by hands. Such a steering rim portion is not comfortable to grip because of the luminous portions. Further, the above configuration hinders observation of the state of lighting of the luminous portions since the luminous portions are hidden by the hands gripping the steering rim portion.

It would be desirable to provide a steering device that includes luminous portions that do not affect the touch while gripped and are easy to observe from the driver.

SUMMARY

An exemplary embodiment of the present disclosure relates to a steering device for a vehicle adapted to be rotated about a steering central axis for maneuvering the vehicle. The steering device includes a central portion that is adapted to be disposed in a vicinity of the steering central axis, and a steering rim portion that is connected with the central portion. The steering rim portion includes: a pair of left and right grip portions for gripping by hands, the left and right grip portions are respectively disposed in a left region and a right region of the steering rim portion which are apart from the steering central axis; a grip sensor that is disposed in each of the left and right grip portions for detecting a grip; and four luminous portions each of which is configured to be lit under control of a control unit for prompting the driver to grip the grip portions, wherein the four luminous portions are respectively disposed in a vicinity of a first end of and in a vicinity of a second end of each of the left and right grip portions, in an area out of the left and right grip portions.

BRIEF DESCRIPTION OF DRAWINGS

FIG. 8A is a chart illustrating the lighting modes of the luminous portions performed at transition to manual driving from autonomous driving of the vehicle.

FIG. 8B is a chart illustrating the lighting modes of the luminous portions performed at hands-off driving during the manual driving mode.

FIGS. 13 and 14 are diagrams illustrating a lighting pattern of yet another modification of the steering device.

DETAILED DESCRIPTION

Exemplary embodiments of the invention are described below with reference to the accompanying drawings. However, the invention is not limited to the embodiments disclosed herein. All modifications within the appended claims and equivalents relative thereto are intended to be encompassed in the scope of the claims.

Figure 1:
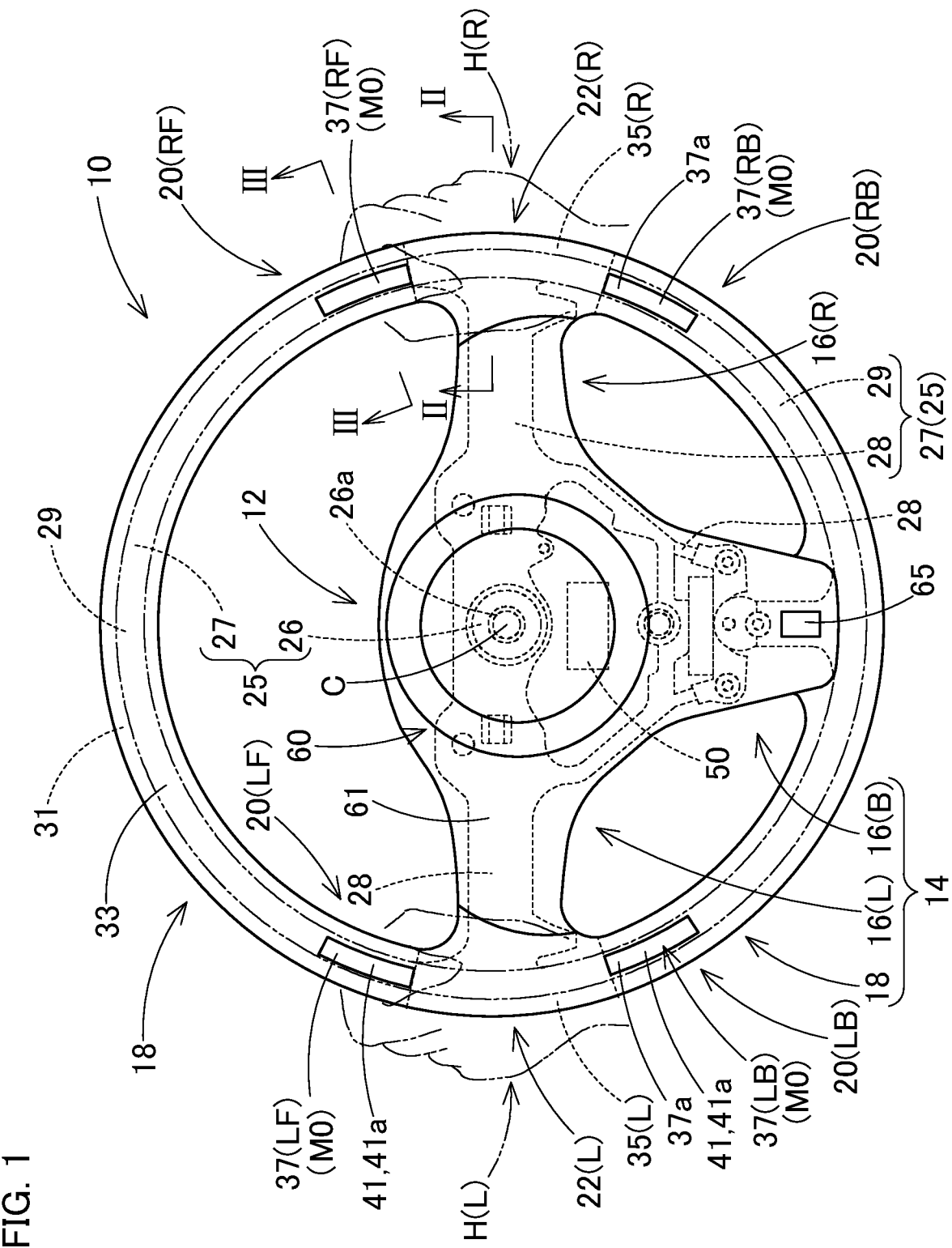
FIG. 1 is a plan view of a steering device in accordance with the exemplary embodiment.
Figure 2:
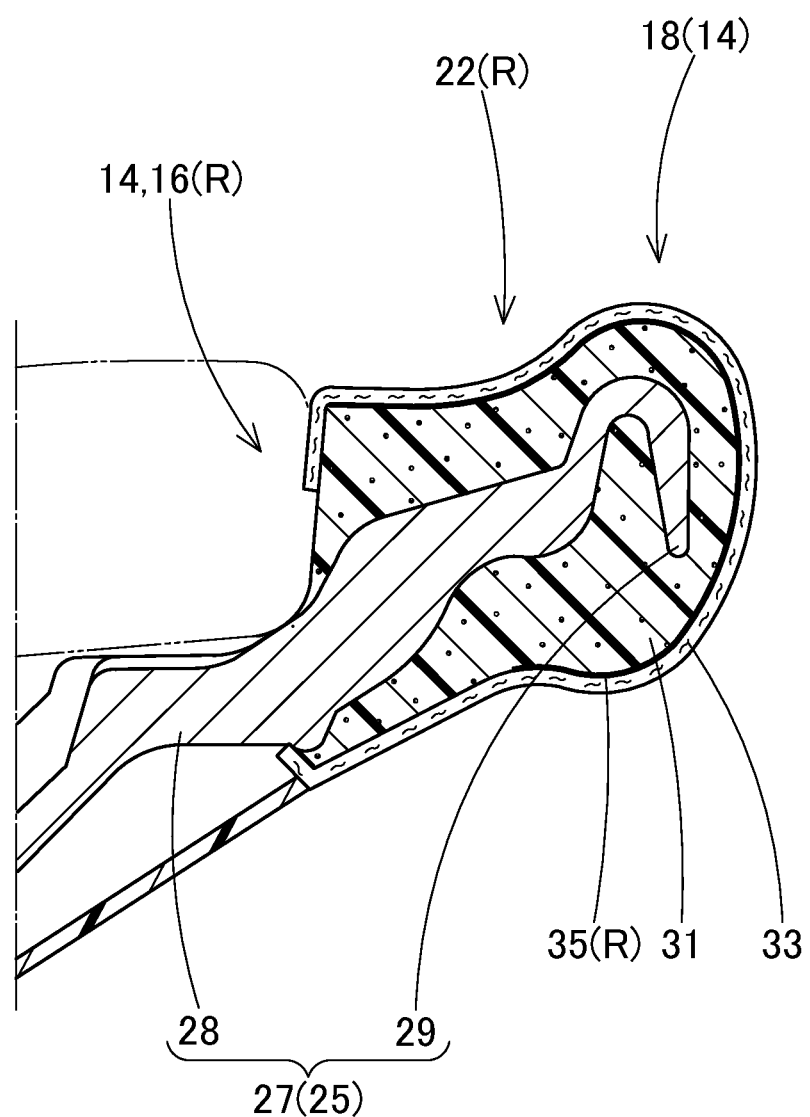
FIG. 2 is a sectional view taken along line II-II of FIG. 1.
Figure 3:
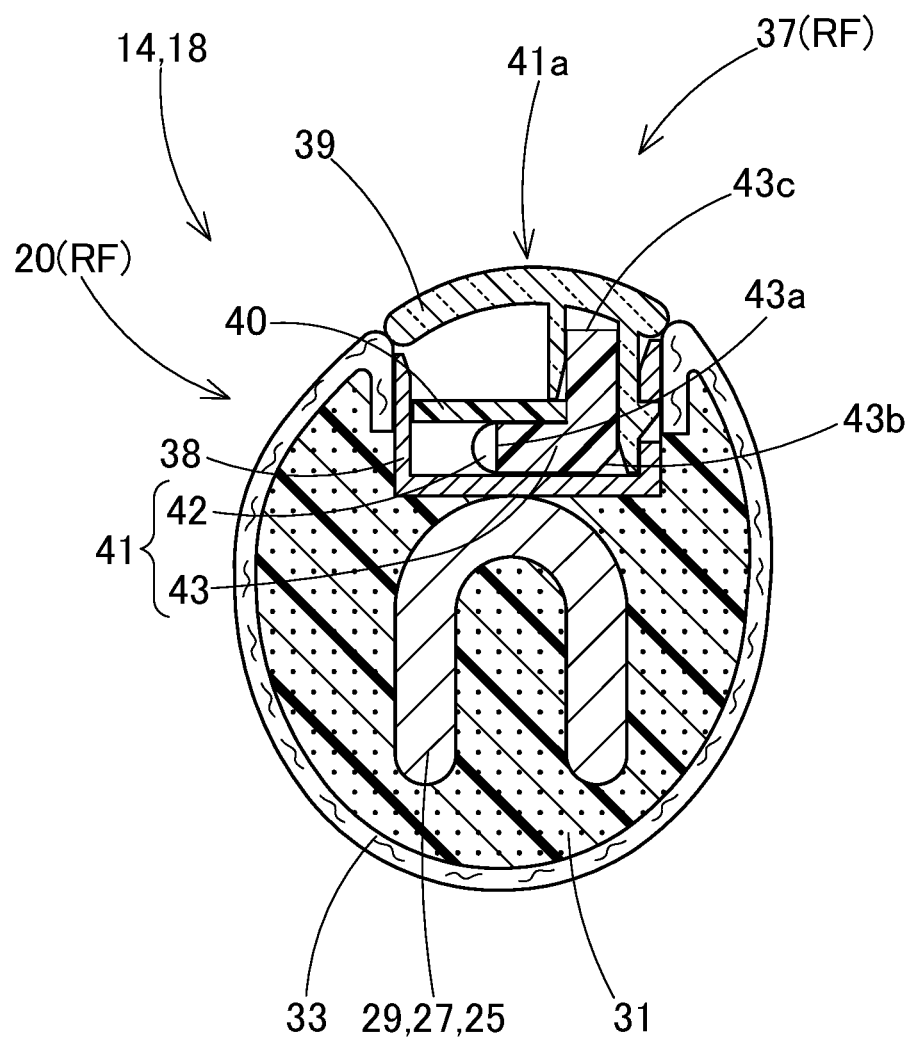
FIG. 3 is a sectional view taken along line III-III of FIG. 1.
Figure 4:
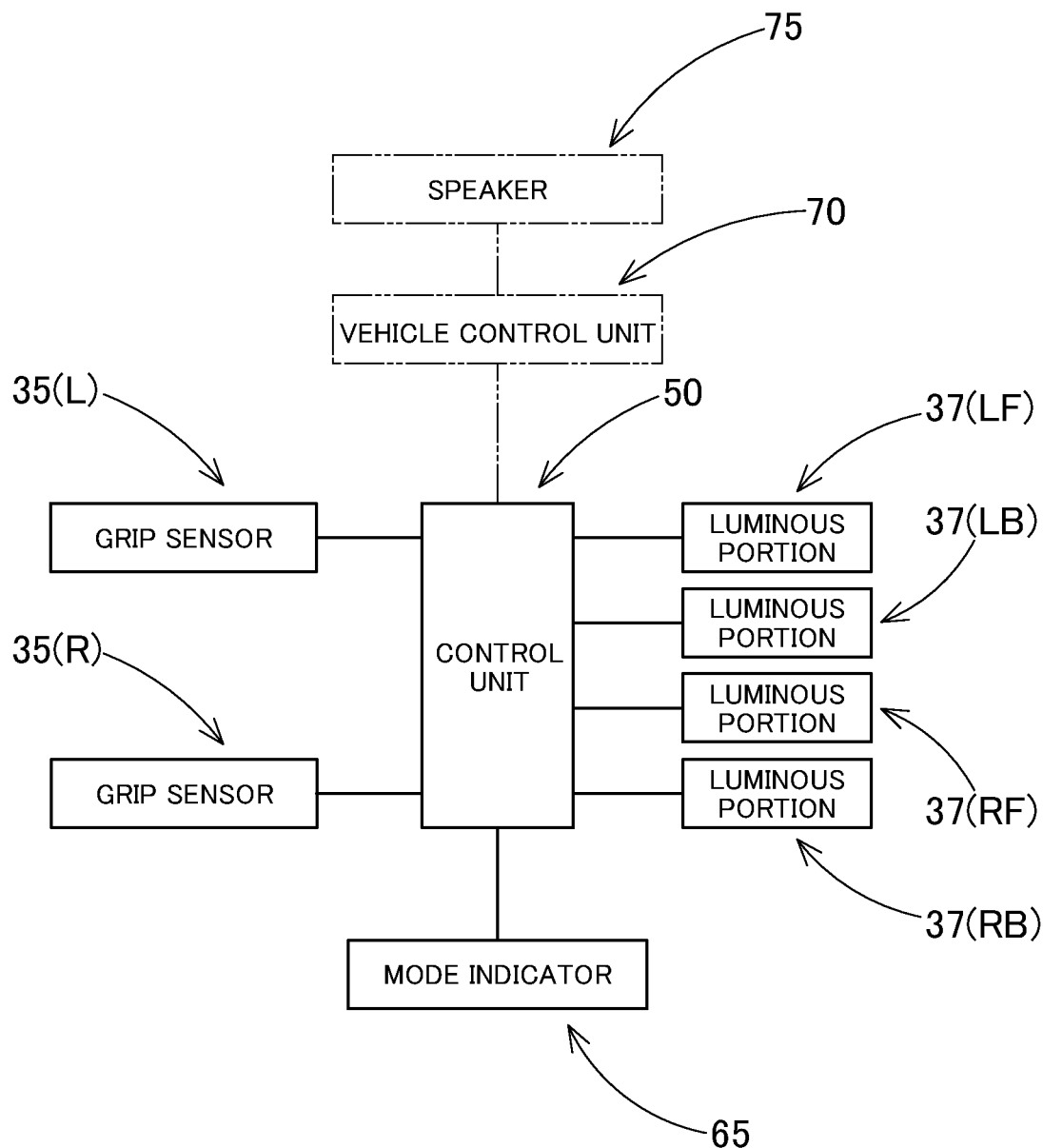
FIG. 4 is a block diagram of the steering device in accordance with the exemplary embodiment.

Referring to FIGS. 1 to 3, a steering device 10 in accordance with the exemplary embodiment is configured to be rotated about the steering central axis C for maneuvering the vehicle. The steering device 10 includes a central portion 12 that is adapted to be placed in a vicinity of the steering central axis C, and a steering rim portion 14 that is connected with the central portion 12 and includes a pair of left and right grip portions 22 (22L, 22R) for gripping for maneuvering the vehicle. Each of the left and right grip portions 22 (22L, 22R) is located in a region of the steering rim portion 14 apart from the steering central axis C in the radial direction.

The steering rim portion 14 includes an annular portion 18 that is annular (circular annular, in this specific embodiment) in shape and located apart from the steering central axis C, and a plurality of connecting portions 16 each of which extends from the central portion 12 radially and is connected to the annular potion 18. The connecting portions 16 are composed of a connecting portion 16L that extends to the left from the central portion 12, a connecting portion 16R that extends to the right from the central portion 12, and a connecting portion 16B that extends backward from the central portion 12.

A pad 61 of an airbag device 60 is disposed on upper surfaces of the central portion 12 and connecting portions 16.

Up-down, left-right and front-back directions in this description are based on the vehicle as steered straight ahead. Specifically, the up and down direction corresponds to an up and down direction extending along the steering central axis C, the left and right direction corresponds to a left and right direction of the vehicle which extends orthogonally to the steering central axis C, and the front and back direction corresponds to a front and back direction of the vehicle which extends orthogonally to the steering central axis C.

The annular portion 18 includes, in a vicinity of each of intersecting regions with the left and right connecting portions 16L, 16R, a left/right grip portion 22 (22L/22R) to be gripped by the driver. That is, the left and right grip portions 22 (22L, 22R) are respectively disposed in a left region and a right region, i.e. in regions apart from the steering central axis C, of the steering rim portion 14. Each of the grip portions 22 (22L, 22R) is provided with a grip sensor 35 for detecting a grip.

The annular portion 18 further includes four luminous portions 37 (37LF, 37LB, 37RF, 37RB) each of which is configured to be lit, under control of a control unit 50, to prompt the driver to grip the grip portions 22. The luminous portions 37 (37LF, 37LB, 37RF, 37RB) are located at four positions proximate to opposite ends of each of the grip portions 22 (22L, 22R), in display areas 20 (20LF, 20LB, 20RF, 20RB) which are out of the left and right grip portions 22.

More particularly, a luminous portion 37LF is disposed in a display area 20LF located proximate to the front end of the left grip portion 22L, and a luminous portion 37LB is disposed in a display area 20LB located proximate to the back end of the left grip portion 22L. A luminous portion 37RF is disposed in a display area 20RF located proximate to the front end of the right grip portion 22R, and a luminous portion 37RB is disposed in a display area 20RB located proximate to the back end of the right grip portion 22R.

The steering device 10 includes a skeleton 25 which is formed from aluminum alloy or the like and has such a shape that the central portion 12 and steering rim portion 14 are interconnected. The skeleton 25 includes a central-skeleton region 26 which is disposed in the central portion 12, and a rim-skeleton region 27 which is disposed in the steering rim portion 14. The rim-skeleton region 27 includes connecting-skeleton regions 28 which are respectively disposed in the connecting portions 16 (16L, 16R, 16B), and a peripheral-skeleton region 29 which is disposed in the annular portion 18. The central-skeleton region 26 includes a boss 26a that is formed from steel and connected to a steering shaft (not shown) which belongs to a vehicle body structure and constitutes the steering central axis C.

As can be seen in FIGS. 2 and 3, the skeleton 25 is covered with a cladding layer 31 on the peripheral-skeleton region 29 and a region of each of the connecting-skeleton regions 28 adjoining the peripheral-skeleton region 29. The cladding layer 31 is further covered by a skin layer 33.

Each of the grip portions 22 (22L, 22R) includes, between the cladding layer 31 and skin layer 33, a grip sensor 35 (35L/35R) that is able to detect whether the driver is gripping the grip portions 22 (22L, 22R) or not by detecting an increase of capacitance due to approximation of fingers or the like of the driver. Each of the grip sensors 35 (35L, 35R) has a sheet shape in which a sheet-shaped member or wire formed from conductor, which serves as a sensor, is arranged on a urethane sheet. The grip sensors 35 are configured to detect a grip by the driver by sensing a change in capacitance due to approximation of the hands or the like of the driver. Each of the grip sensors 35 is connected to the control unit 50 so the control unit 50 is able to determine whether the grip portion 22 is held by the driver or not based on a signal fed from the grip sensor 35.

Referring to FIGS. 1 and 3, each of the luminous portions 37 (37LF, 37LB, 37RF, 37RB) is formed into a light bar that includes a case 38 formed from synthetic resin, a light-emitting portion 41 held by the case 38, and a translucent cover (or lens) 39 that covers an upper surface of the light-emitting portion 41. Each of the luminous portions 37 is located in the upper surface of each of the display areas 20.

The light-emitting portion 41 of each of the luminous portions 37 (37LF, 37LB, 37RF, 37RB) includes one or more light-emitting elements 42 and a light-guiding element 43 that is configured to guide the light emitted by the light-emitting elements 42 to the front side of the light-emitting portion 41 while diffusing the light so as to illuminate the luminous portion 37 uniformly. In this embodiment, the light-emitting portion 41 is formed into a substantially rectangular shape (or a band) extending in a front and back direction along the shape of the annular portion 18 from a vicinity of the grip portion 22 (22L/22R). The light-emitting element 42 of each of the luminous portions 37 is composed of an LED located in the back side of a substrate 40 which has a substantially rectangular plate shape. The light-guiding element 43 of each of the luminous portions 37 is elongated in the front and back direction and has a substantially L sectional shape. The light-guiding element 43 includes a light entrance plane 43a for receiving the light emitted by the light-emitting element 42 at a position facing the light-emitting element 42 in the back side of the substrate 40. A deflecting plane 43b is located at a side of the light entrance plane 43a, and a light exit plane 43c is disposed in a vicinity of the front surface of the light-guiding element 43. The light-guiding element 43 elongated in the front and back direction is able to let out the light emitted by the light-emitting element 42 from its entirety in a diffused state. The light exit plane 43c is configured to diffuse light by having a diffusing layer, by having undergone a microfabrication process or the like.

The light-emitting element(s) 42 of each of the luminous portions 37 is configured to emit a solid light and a blinking light under control of the control unit 50. The color of each of the light-emitting element(s) 42 may be orange, green and red, by way of example.

The control unit 50 that controls the lighting state of the luminous portions 37 is disposed in the central portion 12 of the steering device 10, and is connected to a vehicle control unit 70 as well as to the grip sensors 35 and light-emitting elements 42 of the luminous portions 37. The vehicle control unit 70 is disposed in the vehicle body structure in order to control the driving modes of the vehicle including autonomous driving and manual driving. Specifically, the vehicle control unit 70 outputs a predetermined signal to the control unit 50 of the steering device 10 at switching of the driving mode, and meanwhile transmits a predetermined audio message from a speaker in the instrument panel of the vehicle in response to a signal from the grip sensor(s) 35 as has detected a grip of the grip portion(s) 22 (22L, 22R).

In this specific embodiment, the steering device 10 further includes, in the connecting portion 16B of the steering rim portion 14, by way of example, a mode indicator 65 that indicates the driving mode by a colored light such as blue and orange. The control unit 50 also controls turning on and off of the mode indicator 65.

As various lighting modes controlled by the control unit 50, the luminous portions 37 have a wait mode M0 that is performed to show that a prompting to grip is not conducted, (the luminous portions 37 are unlit, in this specific embodiment), a prompting mode M1 that is performed to prompt to grip, and an alert mode M2, M21, M22, M23 that is performed when, after performance of the prompting mode M1, the control unit 50 did not receive a grip-sensing signal from the grip sensors 35. The alert mode M2 exhibits a lighting pattern which is different from those of the wait mode M0 and prompting mode M1. When receiving a grip-sensing signal from the grip sensor(s) 35 after performance of the prompting mode M1, the control unit 50 may switch the luminous portions 37 back to the wait mode M0, or alternatively, the control unit 50 may switch the luminous portions 37 to a grip confirmation mode M3 that exhibits a lighting pattern which is different from those of the wait mode M0, the prompting mode M1 and the alert mode M2 (see FIG. 8A).

The prompting to grip by the luminous portions 37 is performed at transition from autonomous driving mode to manual driving mode of the vehicle (FIG. 8A), as well as at warning the driver when the driver is not holding the grip portions 22 during manual driving (FIG. 8B). Lighting of the luminous portion 37 as well as operations of the mode indicator 65 and speaker 75 under control of the vehicle control unit 70 are described as follows:

1. Prompting to Grip Performed at Transition from Autonomous Driving Mode to Manual Driving Mode (FIG. 8A)

The mode indicator 65, which had a solid blue light during autonomous driving, turns to a solid orange when the prompting to grip is conducted, then turns off when the vehicle transitioned to manual driving.

1-A. Prior to the transition from autonomous driving to manual driving, the vehicle control unit 70 plays an audio message saying that the autonomous driving will end soon from the speaker 75. At this time, the luminous portions 37 are still in the wait mode M0 and unlit under control of the control unit 50, as can be seen in (A) of FIG. 5.

1-B. Subsequently, the control unit 50 lights the luminous portions 37 solidly in orange in order to prompt the driver to grip the grip portions 22 (prompting mode M1), as can be seen in (B) of FIG. 5. At this time, the vehicle control unit 70 also transmits an audio message saying "Please hold steering wheel" from the speaker 75, as well as turns the mode indicator 65 to orange through the intermediary of the control unit 50.

1-C. If at least one of the grip portions 22 (22L, 22R) is held by the hand(s) H (HL, HR) of the driver, the control unit 50 lights the luminous portions 37 solidly in green in response to a grip-sensing signal fed from the grip sensor(s) 35 (35L, 35R) (grip confirmation mode M3), as can be seen in (C) of FIG. 5. After keeping the luminous portions 37 in the solid green light for a predetermined time period (five seconds, by way of example), the control unit 50 switches the lighting mode to the wait mode M0 and turns off the luminous portions 37, as can be seen in (F) of FIG. 5. At this time, the vehicle control unit 70 transmits from the speaker 75 an audio message saying that the vehicle is now in the manual driving mode, as well as turns off the mode indicator 65 through the intermediary of the control unit 50.

1-D. If any of the grip portions 22 is not gripped within a predetermined time period (five seconds, by way of example) after performance of the prompting mode M1, the control unit 50 transitions to the alert mode M2 and turns the color of the luminous portions 37 to red from orange, as can be seen in (D) of FIG. 5. At this time, the vehicle control unit 70 keeps on playing the audio message saying "Please hold steering wheel" from the speaker 75, as well as keeps the mode indicator 65 in orange light through the intermediary of the control unit 50.

1-E. If any of the grip portions 22 is not gripped within a predetermined time period (ten seconds, by way of example) after performance of the alert mode M2, the control unit 50 transitions to a higher alert mode M21 and blinks the luminous portions 37 in red, as can be seen in (E) of FIG. 5. At this time, the vehicle control unit 70 transmits an audio message saying "The vehicle will pull off to a safe place" from the speaker 75 as notices of stopping of autonomous driving and transition to manual driving. After the vehicle stopped, the control unit 50 turns off the luminous portions 37 and transitions to the wait mode M0, as can be seen in (F) of FIG. 5. At this time, the vehicle control unit 70 transmits from the speaker 75 an audio message saying that the vehicle is now in the manual driving mode, as well as turns off the mode indicator 65 via the control unit 50.

1-F. If at least one of the grip portions 22 (22L, 22R) is held by the hand(s) H (HL, HR) of the driver after performance of the alert mode M2 or M21, the control unit 50 lights the luminous portions 37 solidly in green in response to a grip-sensing signal fed from the grip sensor(s) 35 (35L, 35R) (grip confirmation mode M3), as can be seen in (C) of FIG. 5. Then after a predetermined time period (five seconds, by way of example), the control unit 50 switches the lighting mode to the wait mode M0 and turns off the luminous portions 37, as can be seen in (F) of FIG. 5. At this time, the vehicle control unit 70 transmits from the speaker 75 an audio message saying that the vehicle is now in the manual driving mode, as well as turns off the mode indicator 65 through the intermediary of the control unit 50.

2. Prompting to Grip Performed for Warning the Driver when the Driver is Not Holding the Grip Portions During Manual Driving (FIG. 8B)

The driver is prompted to hold the steering wheel when not holding it during manual driving mode since no-hand or hands-off driving will cause problems.

2-A. During the manual driving mode of the vehicle, if at least one of the grip portions 22 (22L, 22R) is held by the hand(s) H (HL, FIR) of the driver, the control unit 50 detects that by a signal from the grip sensor(s) 35, thus keeps the luminous portions 37 in the wait mode M0, i.e. keeps them unlit, as can be seen in (A) of FIG. 6. The vehicle control unit 70 does not play any audio messages because it is detecting the grip due to a signal from the control unit 50.

2-B. If thereafter the driver releases their hands HL, HR from both of the grip portions 22 (22L, 22R), the control unit 50 detects that by a signal from the grip sensors 35, and lights the luminous portions 37 solidly in orange in order to prompt the driver to grip the grip portions 22 (prompting mode M1), as can be seen in (B) of FIG. 6. At this time, the vehicle control unit 70 also transmits the audio message saying "Please hold steering wheel" from the speaker 75.

Figure 7:
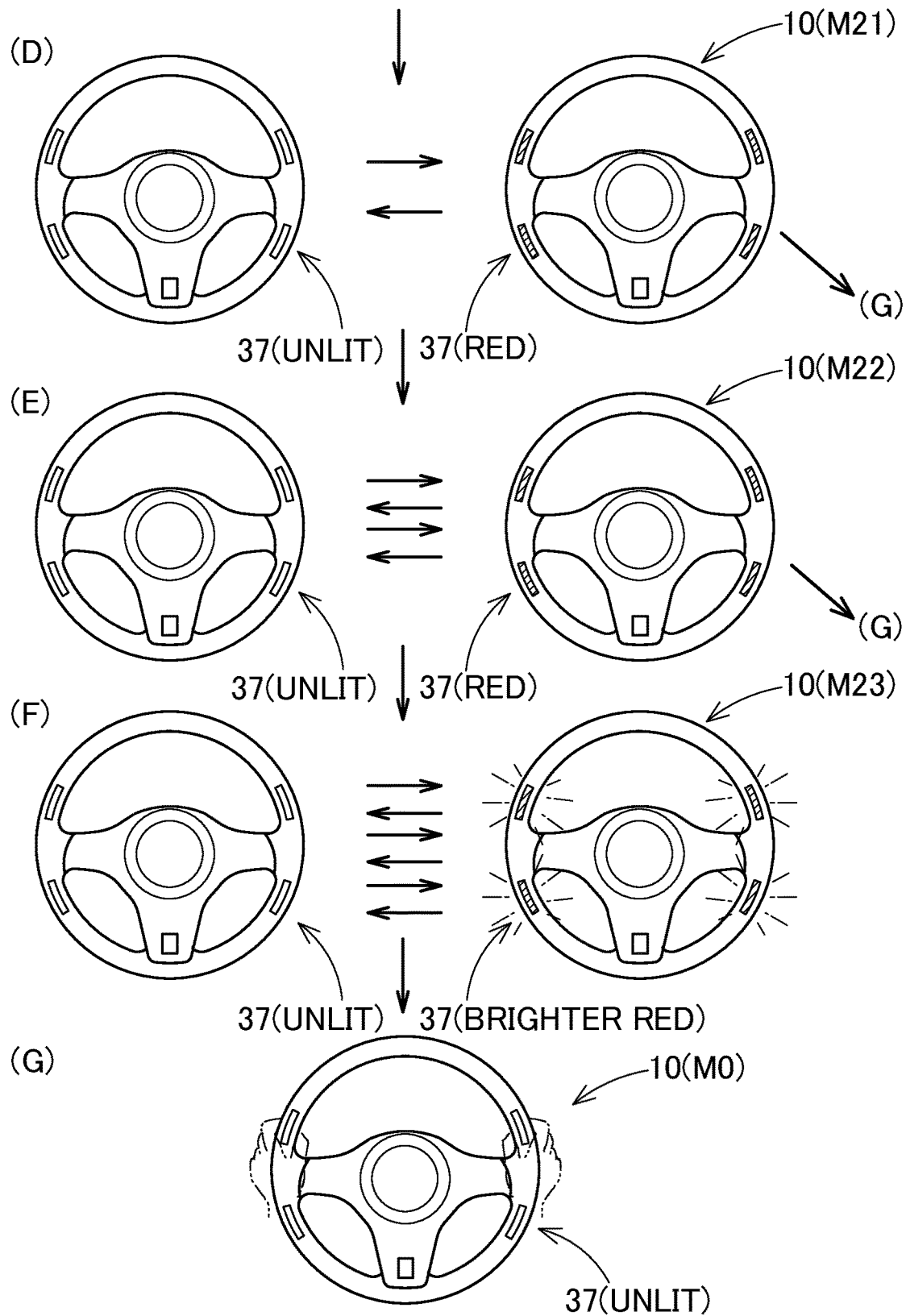

Then if at least one of the grip portions 22 (22L, 22R) is held by the hand(s) H (HL, HR) of the driver, the control unit 50 detects that by a signal from the grip sensor(s) 35, then transitions to the wait mode M0 and turns off the luminous portions 37, as can be seen in (G) of FIG. 7. At this time, the vehicle control unit 70 transmits an audio message saying that the vehicle will continue with the manual driving.

2-C. If any of the grip portions 22 is not gripped within a predetermined time period (three seconds, by way of example) after performance of the prompting mode M1, the control unit 50 transitions to the alert mode M2 and turns the color of the luminous portions 37 to red from orange, as can be seen in (C) of FIG. 6. At this time, the vehicle control unit 70 keeps on playing the audio message saying "Please hold steering wheel" from the speaker 75.

Then if at least one of the grip portions 22 (22L, 22R) is held by the hand(s) H (HL, HR) of the driver, the control unit 50 detects that by a signal from the grip sensor(s) 35, then transitions to the wait mode M0 and turns off the luminous portions 37, as can be seen in (G) of FIG. 7. At this time, the vehicle control unit 70 transmits the audio message saying that the vehicle will continue with the manual driving.

2-D. If any of the grip portions 22 is not gripped within a predetermined time period (five seconds, by way of example) after performance of the alert mode M2, the control unit 50 transitions to the higher alert mode M21 and blinks the luminous portions 37 in red, as can be seen in (D) of FIG. 7. At this time, the vehicle control unit 70 transmits from the speaker 75 an audio message to prompt gripping like "Please hold steering wheel immediately" together with a warning tone such as a beep sound.

2-E. If any of the grip portions 22 is not gripped within a predetermined time period (fifteen seconds, by way of example) after performance of the high alert mode M21, the control unit 50 transitions to an even higher alert mode M22 and blinks the luminous portions 37 more frequently in red, as can be seen in (E) of FIG. 7. At this time, the vehicle control unit 70 transmits from the speaker 75 the audio message to prompt gripping like "Please hold steering wheel immediately" together with the warning tone such as a beep sound.

2-F. If any of the grip portions 22 is not gripped within a predetermined time period (thirty seconds, by way of example) after performance of the high alert mode M22, the control unit 50 transitions to an even higher alert mode M23 and blinks the luminous portions 37 even more frequently with red light having an increased brightness, as can be seen in (F) of FIG. 7. At this time, the vehicle control unit 70 transmits from the speaker 75 an audio message to the effect that the vehicle will avoid danger like "The car will slow down and stop". After the vehicle stopped, the control unit 50 turns off the luminous portions 37 and transitions to the wait mode M0, as can be seen in (G) of FIG. 7. At this time, the vehicle control unit 70 transmits from the speaker 75 an audio message saying that the vehicle made an emergency stop.

2-G. If at least one of the grip portions 22 (22L, 22R) is held by the hand(s) H (HL, HR) of the driver after performance of any of the alert modes M2, M21, M22 or M23, the control unit 50 detects that by a signal from the grip sensors 35, then transitions to the wait mode M0 and turns off the luminous portions 37, as can be seen in (G) of FIG. 7. At this time, the vehicle control unit 70 transmits the audio message saying that the vehicle will continue with the manual driving.

The steering device 10 in accordance with the exemplary embodiment includes the luminous portions 37 (37LF, 37LB, 37RF, 37RB) to be lit for prompting gripping at four locations in a vicinity of the first end of and in a vicinity of the second end of each of the left and right grip portions 22 (22L, 22R), in the area out of the left and right grip portions 22 (22L, 22R) in the steering rim portion 14. That is, the luminous portions 37 (37LF, 37LB, 37RF, 37RB) are not located in the grip portions 22 (22L, 22R). Therefore, the driver is able to hold the grip portions 22 (22L, 22R) without holding the luminous portions 37 (37LF, 37LB, 37RF, 37RB). Moreover, the luminous portions 37 (37LF, 37LB, 37RF, 37RB) are not hidden by the hands gripping the grip portions 22 (22L, 22R), as indicated with dashed-and-double-dotted lines in in FIG. 1, (C) and (F) of FIG. 5, and (G) of FIG. 7. Therefore, the driver is able to observe the state of lighting of the luminous portions 37 (37LF, 37LB, 37RF, 37RB) easily. Although it seems that the hands HL, HR cover the front end portions 37a (FIG. 1) of the luminous portions 37LB, 37RB in the back side in FIG. 1, (C) and (F) of FIG. 5, and (G) of FIG. 7, the hands HL, HR are not in contact with the front end portions 37a, and rear end portions of the luminous portions 37LB, 37RB are easy to see. Therefore, there will be no problem in observance of the state of lighting of the luminous portions 37 (37LF, 37LB, 37RF, 37RB) during holding of the grip portions 22 (22L, 22R). That is, by way of example, in (B) and (C) of FIG. 5, it will be easy to observe the state of lighting of the luminous portions 37LF, 37RF in the front side and luminous portions 37LB, 37RB in the back side in the prompting mode M1.

Although each of the grip portions 22 (22L, 22R) is provided with the grip sensor 35, the grip sensors 35 will not affect the touch in gripping of the grip portions 22 (22L, 22R) because the grip sensors 35 each have a sheet shape and is disposed in the back side of the skin layer 33 which is disposed on the front surface of the grip portion 22, between the skin layer 33 and the cladding layer 31 which is mounted around the peripheral-skeleton region 29 of the skeleton 25 of the steering rim portion 14 (FIG. 2), unlike the luminous portions 37 (37LF, 37LB, 37RF, 37RB) disposed on the front surface of the steering rim portion 14.

Therefore, in the steering device 10 in accordance with the exemplary embodiment, the grip portions 22 (22L, 22R) are comfortable to grip despite of the presence of the luminous portions 37 (37LF, 37LB, 37RF, 37RB). Moreover, the luminous portions 37 (37LF, 37LB, 37RF, 37RB) are easy to observe during holding of the grip portions 22 (22L, 22R).

In the steering device 10 in accordance with the exemplary embodiment, the luminous portions 37 (37LF, 37LB, 37RF, 37RB) have, under control of the control unit 50, a plurality of lighting modes including: the wait mode M0 that shows that a prompting to grip is not conducted; the prompting mode M1 that is performed to prompt a grip; and an alert mode M2, M21, M22, M23 that is configured to be performed when the control unit 50 did not receive a grip-sensing signal from the grip sensors 35 after performance of the prompting mode M1, and exhibits a lighting pattern which is different from those of the wait mode M0 and prompting mode M1.

Accordingly, the driver is able to recognize that they are not prompted to grip the grip portions 22 by the luminous portions 37 (37LF, 37LB, 37RF, 37RB) in the wait mode M0, recognize that they are prompted to hold the grip portions 22 by the luminous portions 37 (37LF, 37LB, 37RF, 37RB) as lit in the prompting mode M1, and recognize, if they do not hold the grip portions 22, that they are strongly prompted to hold the grip portions 22 by the luminous portions 37 (37LF, 37LB, 37RF, 37RB) as lit in the alert mode M2, M21, M22 or M23.

In the steering device 10 in accordance with the exemplary embodiment, the difference among the lighting patterns of the luminous portions 37 (37LF, 37LB, 37RF, 37RB) in the wait mode M0, prompting mode M1 and alert mode M2, M21, M22 or M23 is composed of at least one of: whether the luminous portions 37 (37LF, 37LB, 37RF, 37RB) are lit or not; a difference in color of the luminous portions 37; a difference in brightness of the luminous portions 37; whether the luminous portions 37 have a solid light or a blinking light; a difference in frequency of blinking of the blinking light. Such differences in lighting patterns are easy to recognize. As described later, the difference among the lighting patterns of the luminous portions 37 (37LF, 37LB, 37RF, 37RB) may also be formed by changing the number of lightable portions to be lit among a plurality of lightable portions disposed in each of the luminous portions, with or without combination of at least one of the elements listed above.

Figure 5:
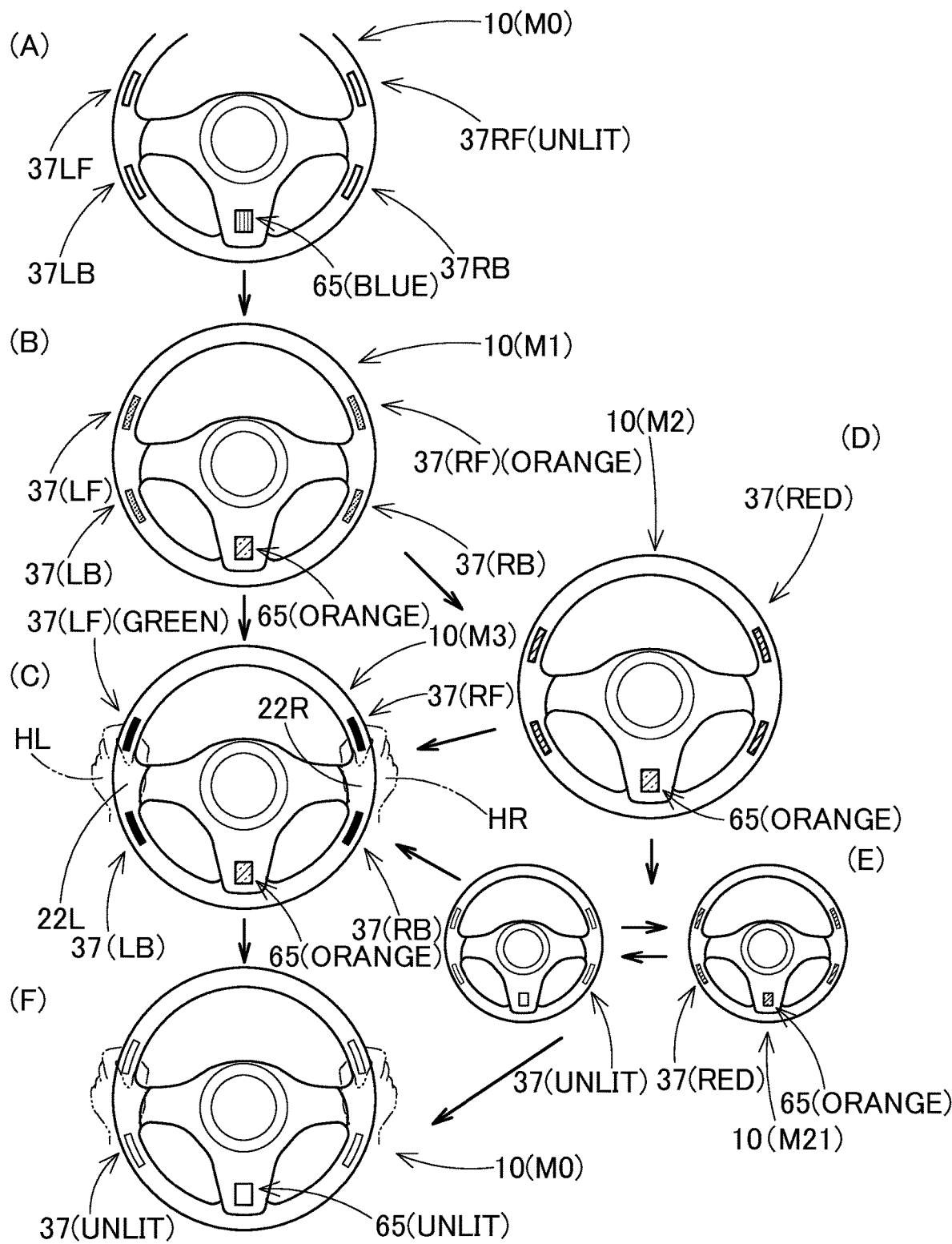
FIG. 5 is a diagram illustrating various lighting modes of luminous portions performed at transition to manual driving from autonomous driving of the vehicle, in the steering device in accordance with the exemplary embodiment.

In the steering device 10 in accordance with the exemplary embodiment, the luminous portions 37 (37LF, 37LB, 37RF, 37RB) are configured to be switched to the grip confirmation mode M3 ((C) of FIG. 5), which exhibits a lighting pattern that is different from those of the wait mode M0, the prompting mode M1 and the alert mode M2, when the control unit 50 received a grip-detecting signal from at least one of the grip sensors 35 (35L, 35R) after performance of the prompting mode M1. In this specific embodiment, the luminous portions 37 (37LF, 37LB, 37RF, 37RB) are solidly lit in green, which is different from orange in the prompting mode M1 and red in the alert mode M2. Thus the driver is able to know that the grip is recognized.

Figure 6:
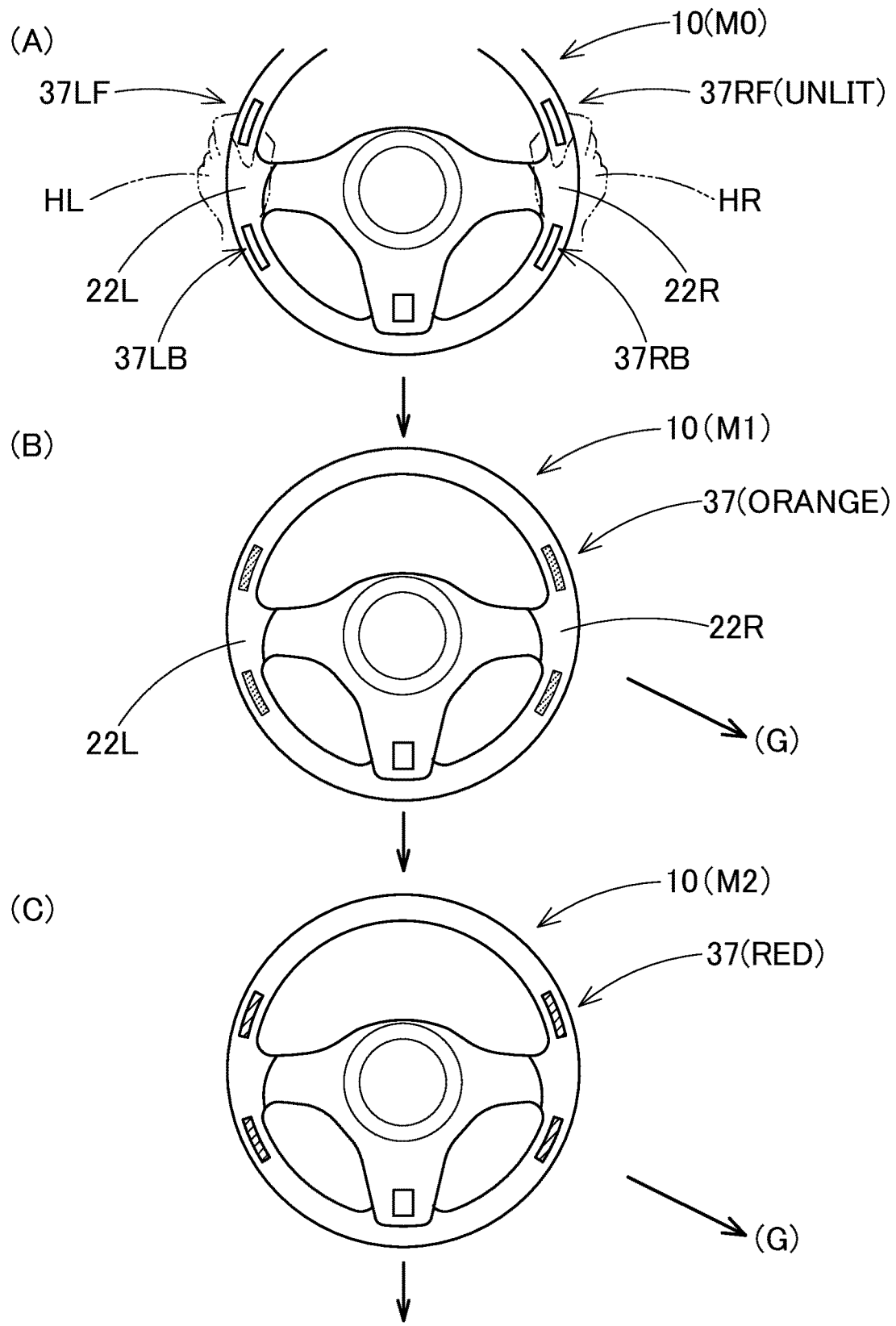
FIGS. 6 and 7 are diagrams illustrating various lighting modes of the luminous portions performed at hands-off driving during the manual driving mode.

As described above, in one or more embodiment, the control unit 50 may switch the luminous portions 37 (37LF, 37LB, 37RF, 37RB) to the wait mode M0 when it received a grip-sensing signal from at least one of the grip sensors 35 after performance of the prompting mode M1, as can be seen in (A) of FIG. 6 and (G) of FIG. 7.

In the steering device 10 in accordance with the exemplary embodiment, each of the four luminous portions 37 (37LF, 37LB, 37RF, 37RB) includes the light-emitting portion 41 that has a band-shape extending substantially along the front and rear direction from a vicinity of one of the grip portions 22 (22L, 22R), and each of the light-emitting portions 41 includes the light-emitting elements 42 and the light-guiding element 43 that is configured to guide the light emitted by the light-emitting elements 42 to the front side of the light-emitting portion 41 while diffusing the light so as to illuminate the luminous portion 37 uniformly. Each of the luminous portions 37 is formed substantially into a rectangle extending substantially along a circumferential direction of the annular portion 18, as can be seen in FIGS. 1 and 3. More particularly, since the light exit plane 43c of the light-guiding element 43 extends substantially along the front and rear direction in a band shape, a light-emitting surface 41a of each of the light-emitting portions 41 luminesces in a substantially rectangular shape similar to the light exit plane 43c.

This configuration will illuminate each of the luminous portions 37 (37LF, 37LB, 37RF, 37RB) in an elongated shape in the front and rear direction that is easy to see from the driver.

Figure 9:
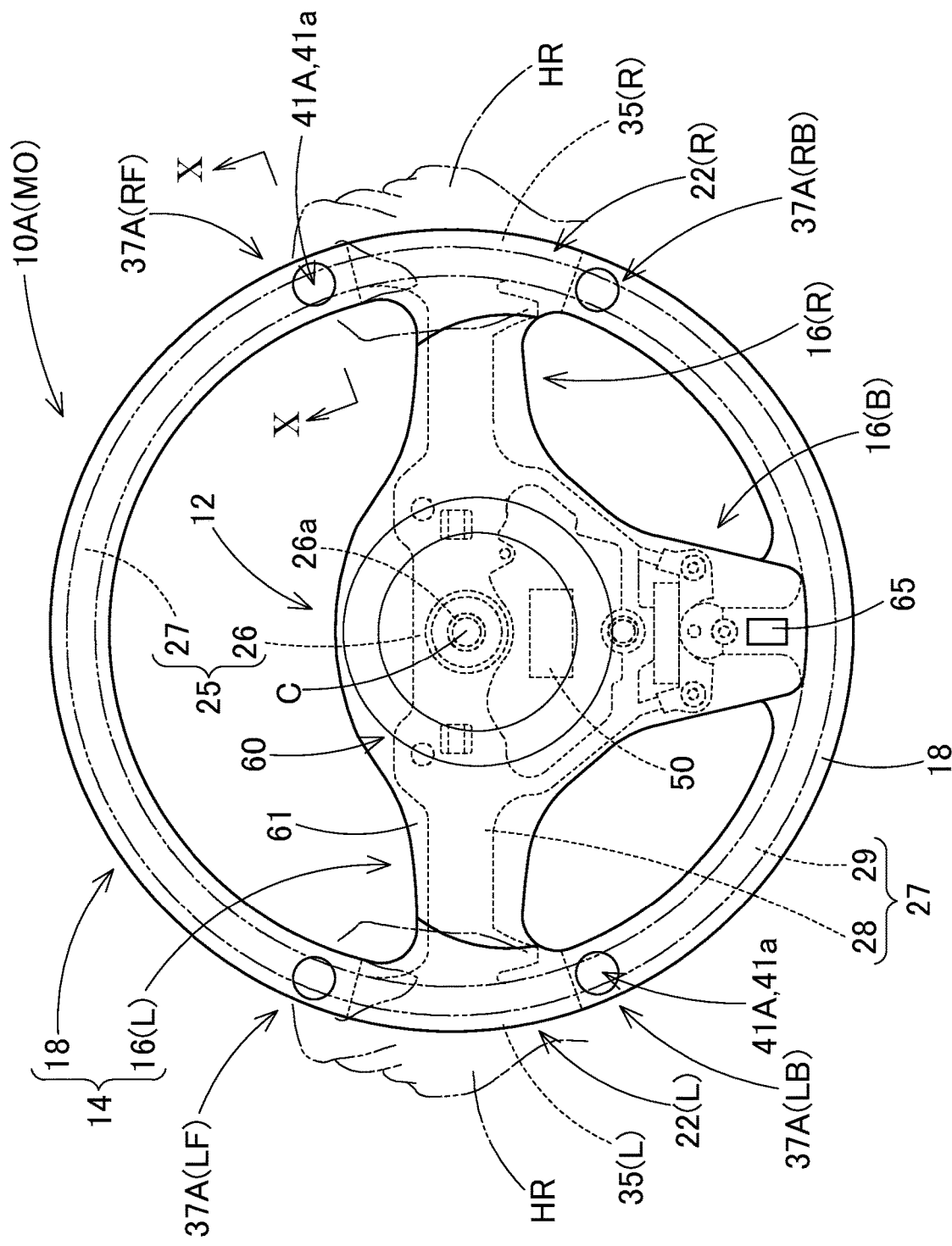
FIG. 9 is a plan view of a modification of the steering device of the exemplary embodiment.
Figure 10:
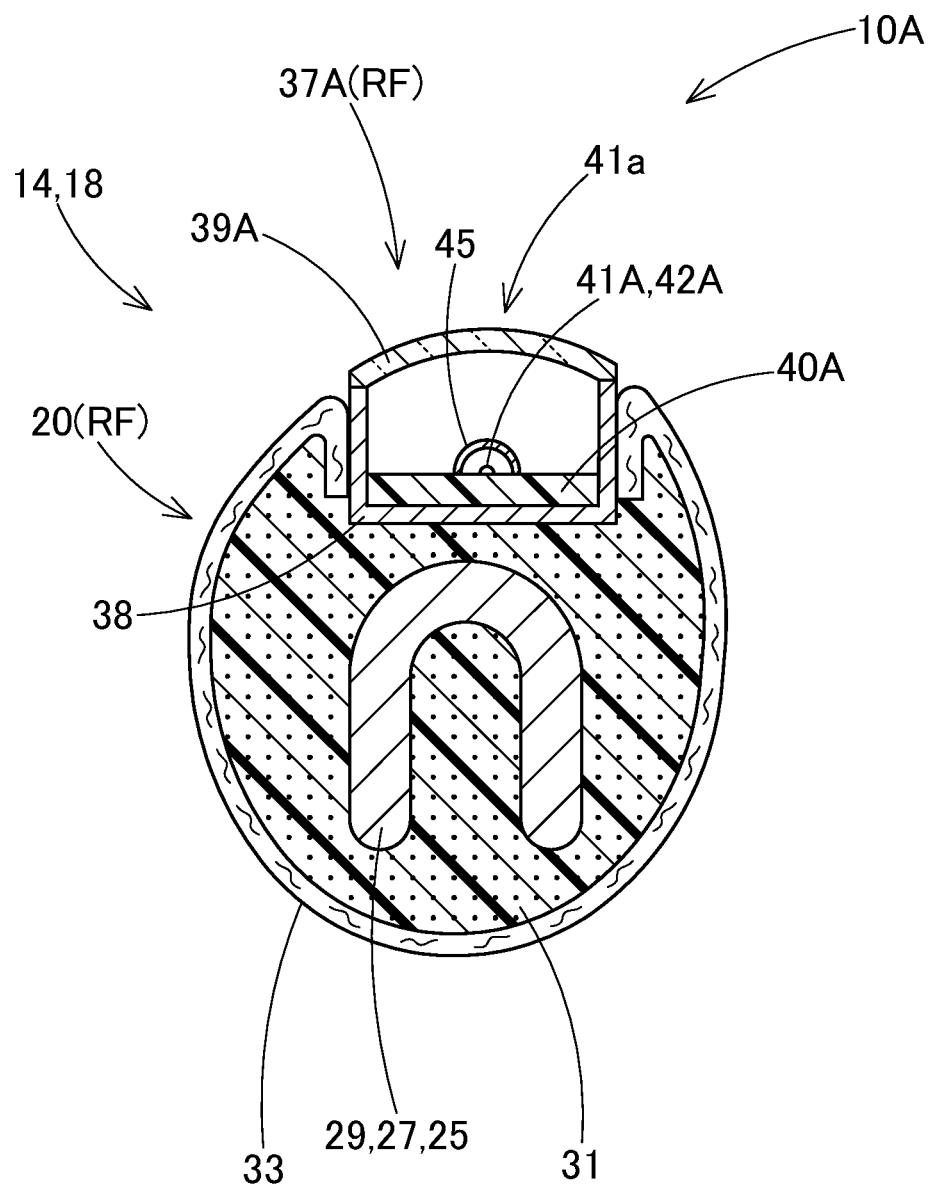
FIG. 10 is a sectional view taken along line X-X of FIG. 9.

Each of the luminous portions may include at least one light-emitting portion composed of a point light source, as in a steering device 10A depicted in FIGS. 9 and 10. In the steering device 10A, each of the luminous portions 37A includes a case 38 formed from synthetic resin, a light-emitting portion 41A held by the case 38, and a substantially circular translucent cover (or lens) 39A that covers an upper surface of the light-emitting portion 41A. Each of the luminous portions 37A is located in the upper surface of each of the display areas 20.

The light-emitting portion 41A of each of the luminous portions 37A includes a substrate 40A having a substantially square shape, one or more light-emitting elements 42A that is disposed on a front surface of the substrate 40A and each composed of a point source LED, and a cover (or lens) 45 that is configured to diffuse the light emitted by the light-emitting element 42A and covers the light-emitting element 42A. A light-emitting surface 41a of the light-emitting portion 41A is configured to luminesce in a round dot shape identical to the outer shape of the cover 39A. The control unit 50 is configured to light each of the light-emitting elements 42A solidly in orange, green, or red, or blink each of the light-emitting elements 42A in those colors. That is, similarly to the luminous portions 37 in the foregoing embodiment, each of the luminous portions 37A may be lit in the wait mode M0, prompting mode M1, alert mode M2, and grip confirmation mode M3.

Figure 11:
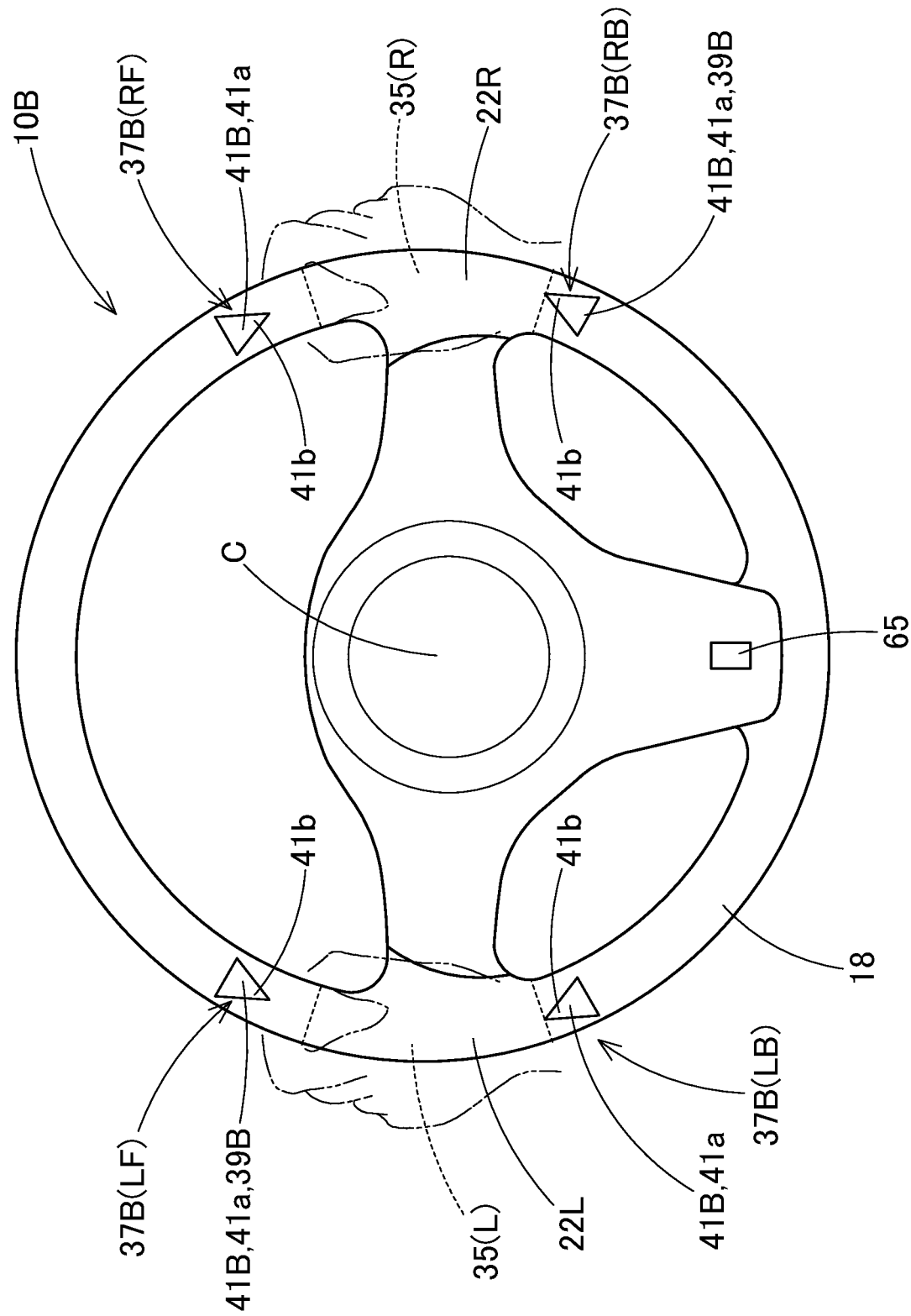
FIG. 11 is a plan view of another modification of the steering device of the exemplary embodiment.
Figure 12:
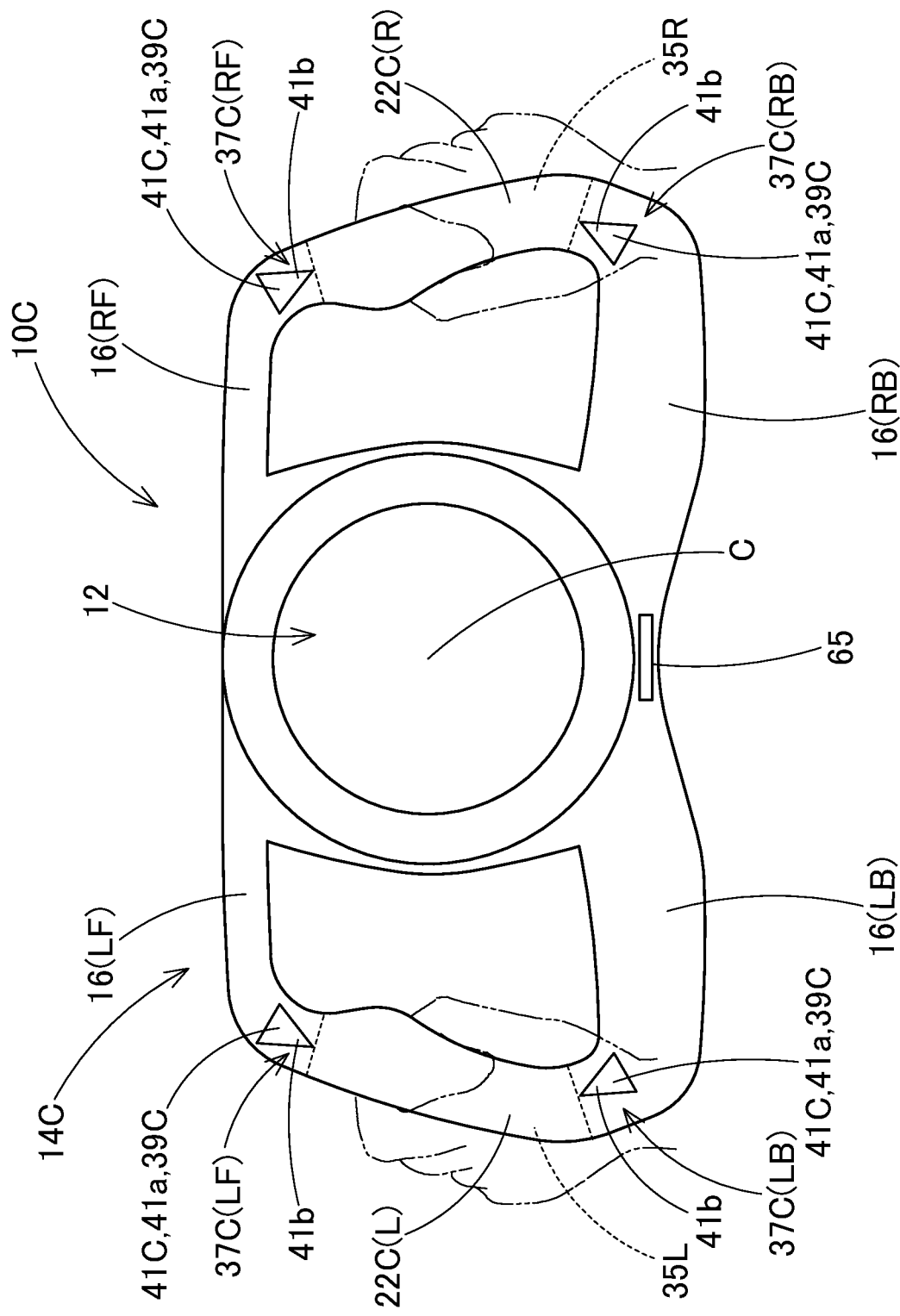
FIG. 12 is a plan view of yet another modification of the steering device of the exemplary embodiment.

The luminous portion may have a triangular light-emitting surface 41a as in light-emitting portions 41B, 41C of luminous portions 37B, 37C of steering devices 10B, 10C depicted in FIGS. 11 and 12. Similarly to the steering device 10A, each of the luminous portions 37B, 37C includes a light-emitting element that is composed of a point source LED and covered by a predetermined lens, and a triangular translucent cover 39B, 39C that covers the light-emitting element. Thus, when lit, the light-emitting surface 41a of each of the luminous portions 37B, 37C is illuminated in a triangular shape identical to the outer shape of the cover 39B, 39C.

When the luminous portion includes a light-emitting portion composed of a point source LED, the luminous portion may be provided with a light-emitting surface 41a that includes an angled portion 41b tapering toward the adjoining grip portion 22L/22R, like the luminous portions 37B, 37C of the steering devices 10B, 10C depicted in FIGS. 11 and 12. Since the angled portions 41a of the light-emitting surfaces 41a of the luminous portions 37B, 37C point to the grip portions 22L, 22R like arrows when lit, the luminous portions 37B, 37C are able to attract driver's attention to the grip portions 22L, 22R visually.

In terms of the outer shape of the steering device, the steering device may be configured to include the circular annular portion 18 that is provided with the grip portions 22L, 22R in a part of each of the left region and right region, as in the steering devices 10, 10A, 10B shown in FIGS. 1, 9 and 11. Alternatively, the steering device may be configured to include a rectangular steering rim portion 14C like the steering device 10C depicted in FIG. 12. The steering rim portion 14C includes a central portion 12, grip portions 22C (L, R) and connecting portions 16LF, 16LB, 16RF, 16RB that interconnect the central portion 12 and vicinities of front and back ends of the grip portions 22C.

In one or more embodiments, each of the luminous portions may be configured like luminous portions 37D of a steering device 10D depicted in FIGS. 13 and 14. Each of the luminous portions 37D of the steering device 10D includes a plurality of (three, by way of example) light-emitting portions 41D (41D1, 41D2, 41D3) that are lined up toward an adjoining grip portion 22L/22R. Each of the luminous portions 37D is configured such that, when lit, the light-emitting portions 41D are lit in sequence toward the grip portion 22L/22R from the far side of the grip portion 22L/22R. That is, in each of the luminous portions 37D, at the beginning, a light-emitting portion 41D1 disposed in the far side of the grip portion 22L/22R is lit as can be seen in FIG. 13, then a middle light-emitting portion 41D2 is lit with the light-emitting portion 41D1 staying lit, as can be seen in (A) of FIG. 14, and then a light-emitting portion 41D3 disposed close to the grip portion 22L/22R is lit, thus all the light-emitting portions 41D are lit as can be seen in (B) of FIG. 14. This configuration is able to make each of the luminous portions 37D luminesce in a running manner by changing the number of light-emitting portions to be lit among the plurality of light-emitting portions. Changing of the number of light-emitting portions to be lit among the plurality of light-emitting portions will also constitute an element for creating a difference in lighting patterns of the luminous portions, similarly to other elements such as whether the luminous portions are lit or not, a difference in color of the luminous portions, a difference in brightness of the luminous portions, whether the luminous portions have a solid light or a blinking light, and a difference in frequency of blinking of the blinking light. Each of the light-emitting portions 41D1, 41D2 and 41D3 is provided with a light-emitting element (LED) 42D composed of a point light source.

Figure 15:
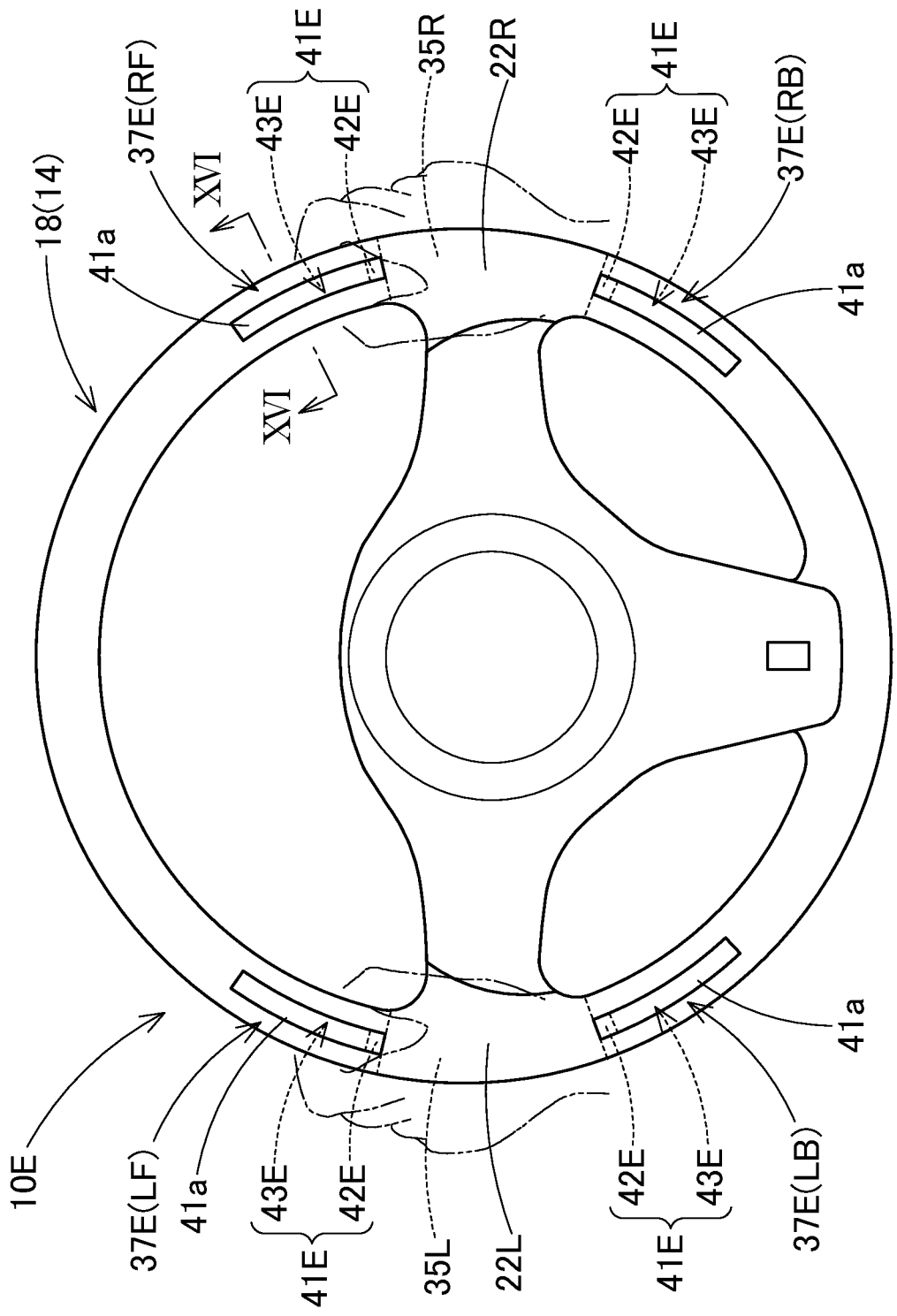
FIG. 15 is a plan view of yet another modification of the steering device.
Figure 16:
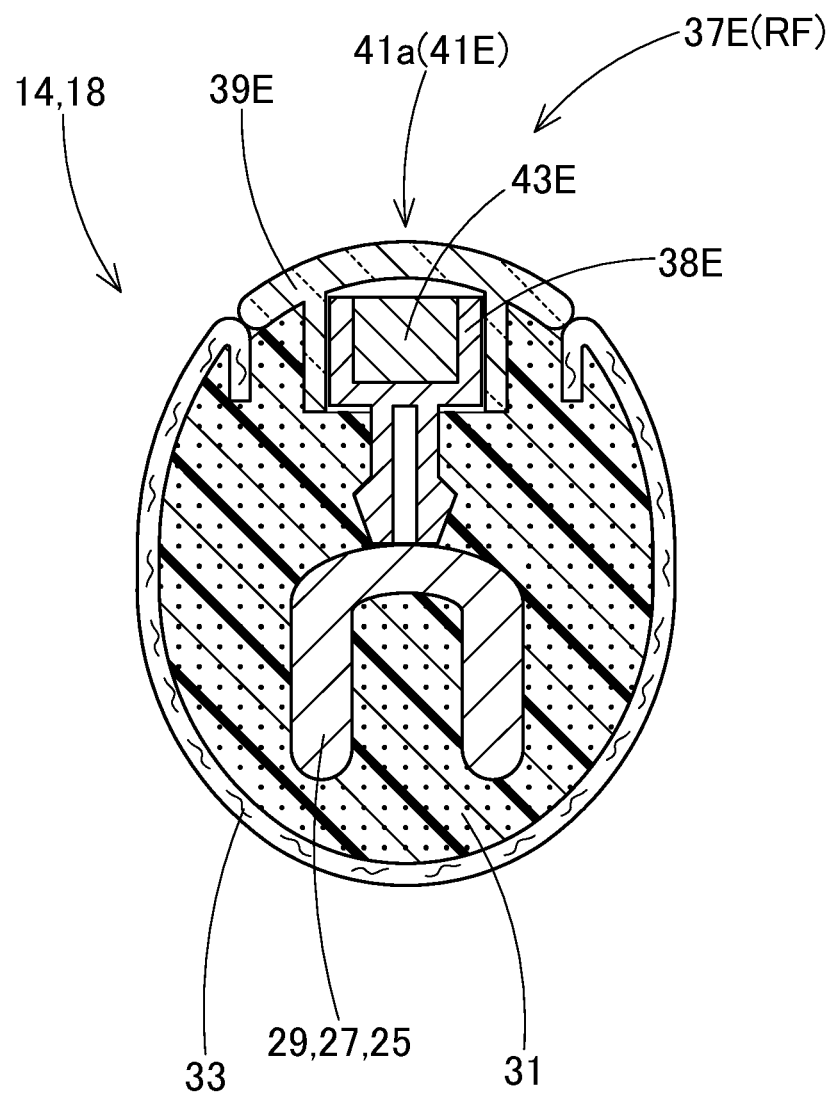
FIG. 16 is a sectional view taken along line XVI-XVI of FIG. 15.
Figure 17:
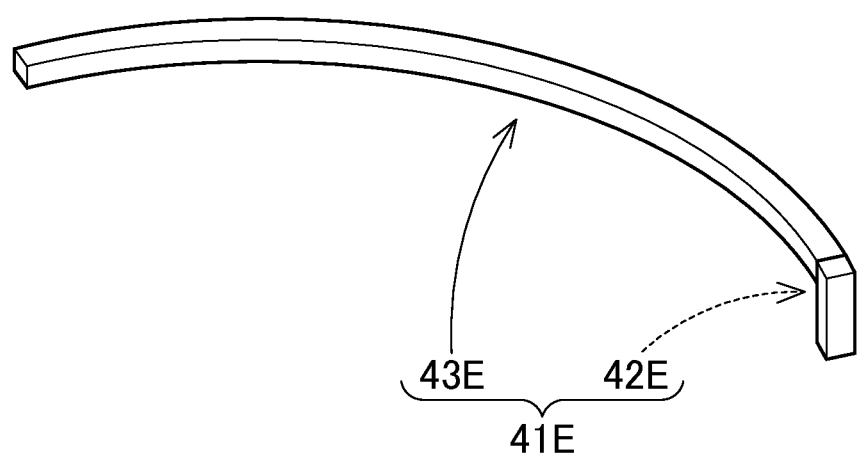
FIG. 17 is a schematic perspective view of a chief part of a luminous portion in the steering device of FIG. 15.

The luminous portion may be configured like luminous portions 37E of a steering device 10E depicted in FIG. 15. A light-emitting portion 41E of the luminous portion 37E includes a single light-emitting element 42E composed of a point light source. A light-guiding element 43E elongated along the steering rim portion 14 is assembled with the single light-emitting element 42E. The light-emitting portion 41E is held by a case 38E and covered with a cover (or lens) 39E, and disposed in the annular portion 18 as can be seen in FIGS. 15, 16, and 17, so that a light-emitting surface 41a of the light-emitting portion 41E is elongated along the annular portion 18. With this configuration, each of the luminous portions 37E is illuminated uniformly because the light-guiding element 43E elongated along the annular portion 18 of the steering rim portion 14 guides the light emitted by the light-emitting element 42E composed of the point light source to the light-emitting surface 41a elongated along the annular portion 18 while diffusing the light.

The exemplary embodiment relates to a steering device for a vehicle adapted to be rotated about a steering central axis for maneuvering the vehicle. The steering device includes a central portion that is adapted to be disposed in a vicinity of the steering central axis, and a steering rim portion that is connected with the central portion. The steering rim portion includes: a pair of left and right grip portions for gripping by hands, the left and right grip portions are respectively disposed in a left region and a right region of the steering rim portion which are apart from the steering central axis; a grip sensor that is disposed in each of the left and right grip portions for detecting a grip; and four luminous portions each of which is configured to be lit under control of a control unit for prompting the driver to grip the grip portions, wherein the four luminous portions are respectively disposed in a vicinity of a first end of and in a vicinity of a second end of each of the left and right grip portions, in an area out of the left and right grip portions.

The steering device in accordance with the exemplary embodiment includes the luminous portions to be lit for prompting gripping at four locations in a vicinity of the first end of and in a vicinity of the second end of each of the left and right grip portions, in the area out of the left and right grip portions in the steering rim portion. That is, the luminous portions are not located in the grip portions. Therefore, the driver is able to hold the grip portions without holding the luminous portions. Moreover, the luminous portions are not hidden by the hands as gripping the grip portions. Therefore, the driver is able to observe the state of lighting of the luminous portions easily.

Although each of the grip portions is provided with a grip sensor, the grip sensors will not affect the touch in gripping of the grip portions because the grip sensors are each disposed in the back side of a skin layer which is disposed on the front surface of the grip portion, between the skin layer and a cladding layer which is mounted around a skeleton of the steering rim portion, unlike the luminous portions disposed on the front surface of the steering rim portion.

Therefore, in the steering device in accordance with the exemplary embodiment, the grip portions are comfortable to grip despite of the presence of the luminous portions to be lit for prompting the driver to grip the grip portions. Moreover, the luminous portions are easy to observe during holding of the grip portions.

In one or more embodiments, the steering device may further include a plurality of lighting modes of the luminous portions performed under control of the control unit, the plurality of lighting modes including: a wait mode that shows that a prompting to grip is not conducted, the wait mode exhibiting a first lighting pattern; a prompting mode that exhibits a second lighting pattern to prompt gripping, the second lighting pattern being different from the first lighting pattern; and an alert mode that is configured to be performed when the control unit did not receive a grip-sensing signal from the grip sensors after performance of the prompting mode, the alert mode exhibiting a third lighting pattern that is different from the first lighting pattern and second lighting pattern.

With this configuration, the driver is able to recognize that they are not prompted to grip the grip portions by the luminous portions in the wait mode, recognize that they are prompted to hold the grip portions by the luminous portions as lit in the prompting mode, and recognize, if they do not hold the grip portions, that they are strongly prompted to hold the grip portions by the luminous portions as lit in the alert mode.

In one or more embodiments, differences among the lighting patterns of the wait mode, prompting mode and alert mode may be composed of at least one of: whether the luminous portions are lit or not; a difference in color of the luminous portions; a difference in brightness of the luminous portions; whether the luminous portions have a solid light or a blinking light; a difference in frequency of blinking of the blinking light; and a difference in number of lightable portions to be lit among a plurality of lightable portions.

In one or more embodiments, the steering device may further include a grip confirmation mode of the luminous portions that is performed when the control unit received a grip-sensing signal from at least one of the grip sensors after performance of the prompting mode. The grip confirmation mode is configured to perform a lighting pattern that is different from those of the wait mode, the prompting mode and the alert mode. Alternatively, the control unit may switch the luminous portions to the wait mode when it received a grip-sensing signal from at least one of the grip sensors after performance of the prompting mode.

In one or more embodiments, each of the four luminous portions may include a light-emitting portion that has a band shape extending from a vicinity of one of the grip portions. Each of the light-emitting portions includes one or more light-emitting elements and one or more light-guiding elements. In one or more embodiments, each of the four luminous portions may include at least one light-emitting portion that is composed of a point light source.

When each of the four luminous portions includes a light-emitting portion composed of a point light source, the luminous portion may have a light-emitting surface that includes a portion that tapers toward adjoining one of the grip portions. Since the tapering portion of the light-emitting surface of each of the luminous portions points to the grip portion like an arrow when lit, the luminous portions are able to attract driver's attention to the grip portions visually.

In one or more embodiments, each of the four luminous portions may include a plurality of the light-emitting portions that are lined up toward adjoining one of the grip portions. The plurality of light-emitting portions may be configured to be lit in sequence toward the adjoining one of the grip portions from a far side of the adjoining one of the grip portions, when lit. This configuration is able to make each of the luminous portions luminesce in such a manner as to be running toward the grip portion, thus able to attract driver's attention to the grip portions further.

What is claimed is:

1. A steering device for a vehicle adapted to be rotated about a steering central axis for maneuvering the vehicle, the steering device comprising:
    a central portion that is adapted to be disposed in a vicinity of the steering central axis; and
    a steering rim portion that is connected with the central portion,
    wherein the steering rim portion includes:
        a pair of left and right grip portions for gripping by hands, the left and right grip portions are respectively disposed in a left region and a right region of the steering rim portion which are apart from the steering central axis;
        a grip sensor that is disposed in each of the left and right grip portions for detecting a grip; and
        four luminous portions each of which is configured to be lit under control of a control unit for prompting the driver to grip the grip portions, wherein the four luminous portions are respectively disposed in a vicinity of a first end of and in a vicinity of a second end of each of the left and right grip portions, in an area out of the left and right grip portions,
    further including a plurality of lighting modes of the luminous portions performed under control of the control unit, the plurality of lighting modes including:
    a wait mode that shows that a prompting to grip is not conducted, the wait mode exhibiting a first lighting pattern;
    a prompting mode that exhibits a second lighting pattern to prompt gripping, the second lighting pattern being different from the first lighting pattern; and
    an alert mode that is configured to be performed when the control unit did not receive a grip-sensing signal from the grip sensors after performance of the prompting mode, the alert mode exhibiting a third lighting pattern that is different from the first lighting pattern and second lighting pattern.

2. The steering device of claim 1, wherein differences among the lighting patterns of the wait mode, prompting mode and alert mode are composed of at least one of: whether the luminous portions are lit or not; a difference in color of the luminous portions; a difference in brightness of the luminous portions; whether the luminous portions have a solid light or a blinking light; a difference in frequency of blinking of the blinking light; and a difference in number of lightable portions to be lit among a plurality of lightable portions disposed in each of the luminous portions.

3. The steering device of claim 1, further including a grip confirmation mode of the luminous portions that is performed when the control unit received a grip-sensing signal from at least one of the grip sensors after performance of the prompting mode, wherein the grip confirmation mode is configured to perform a lighting pattern that is different from those of the wait mode, the prompting mode and the alert mode.

4. The steering device of claim 1, wherein the control unit is configured to switch the luminous portions to the wait mode when it received a grip-sensing signal from at least one of the grip sensors after performance of the prompting mode.

5. The steering device of claim 1, wherein:
    each of the four luminous portions includes a light-emitting portion that has a band shape extending from a vicinity of one of the grip portions; and
    each of the light-emitting portions includes one or more light-emitting elements and one or more light-guiding elements.

6. The steering device of claim 1, wherein each of the four luminous portions includes at least one light-emitting portion that is composed of a point light source.

7. The steering device of claim 6, wherein each of the four luminous portions has a light-emitting surface that includes a portion that tapers toward adjoining one of the grip portions.

8. The steering device of claim 6, wherein:
    each of the four luminous portions includes a plurality of the light-emitting portions that are lined up toward adjoining one of the grip portions; and
    when lit, the plurality of light-emitting portions are configured to be lit in sequence toward the adjoining one of the grip portions from a far side of the adjoining one of the grip portions.

* * * * *